(12) United States Patent
Gervais

(10) Patent No.: US 6,373,556 B1
(45) Date of Patent: Apr. 16, 2002

(54) X-RAY TRANSPARENCY SCANNER

(76) Inventor: Michel Gervais, 194, 6$^{th}$ Avenue, Grand-Mère, Quebec (CA), G9T 2G6

( * ) Notice: Subject to any disclaimer, the term of this patent is extended or adjusted under 35 U.S.C. 154(b) by 0 days.

(21) Appl. No.: 09/458,760

(22) Filed: Dec. 10, 1999

(51) Int. Cl.$^7$ .......................... H01N 1/04; G03B 27/62; G03B 27/72
(52) U.S. Cl. .......................... 355/75; 355/69; 355/70; 358/474; 358/487; 378/210
(58) Field of Search .............. 355/18, 70, 75, 355/67, 68, 69; 358/506, 474, 475, 487, 494, 401; 348/96; 399/378, 379, 380; 378/210

(56) References Cited

U.S. PATENT DOCUMENTS

| | | | |
|---|---|---|---|
| 3,953,125 A | | 4/1976 | Bost |
| 4,618,254 A | | 10/1986 | Therrien et al. |
| 4,702,593 A | * | 10/1987 | Detsch .......................... 358/67 |
| 4,816,921 A | * | 3/1989 | Akiyama et al. ........... 358/494 |
| 5,119,212 A | * | 6/1992 | Mori et al. ................. 358/474 |
| 5,218,463 A | | 6/1993 | Lianza et al. |
| 5,282,081 A | * | 1/1994 | Chen et al. ................. 358/474 |
| 5,381,245 A | | 1/1995 | Johnston et al. |
| 5,430,289 A | | 7/1995 | Erickson et al. |
| 5,467,172 A | | 11/1995 | Liao |
| 5,483,325 A | * | 1/1996 | Bodapati et al. .............. 355/75 |
| 5,606,450 A | | 2/1997 | Chen |
| 5,652,665 A | | 7/1997 | Chen et al. |
| 5,745,262 A | | 4/1998 | Tatsumi |
| 5,781,311 A | | 7/1998 | Inoue et al. |
| 5,907,413 A | * | 5/1999 | Han ........................... 358/474 |
| 5,986,774 A | * | 11/1999 | Han ........................... 358/487 |
| 5,993,023 A | * | 11/1999 | Lin ............................. 355/67 |
| 6,188,501 B1 | * | 2/2001 | Neushul ..................... 358/474 |

FOREIGN PATENT DOCUMENTS

| | | |
|---|---|---|
| EP | 0 386 415 A1 B1 | 9/1990 |
| FR | 2672760 A | 8/1992 |

OTHER PUBLICATIONS

Http://www.usa.canon.com/indtech/medeq/scan300.html, 1p.
Http://www.usa.canon.com/indtech/medeq/scan300fea.html, 1p.
Http://www.usa.canon.com/indtech/medeq/scan300spec.html, 1 p.

* cited by examiner

*Primary Examiner*—Alan A. Mathews
(74) *Attorney, Agent, or Firm*—Ogilvy Renault; James Anglehart

(57) ABSTRACT

A light box comprises two halogen 500 watt lamps supplied with DC rectified power, a scanning window made of 3 sheets, a thermoswitch, a fan and an intensity control circuit. The light box is adapted to be used with a reflective-type scanner. When a reflective-type scanner is mounted on the scanning window of the light box, the apparatus is able to scan X-ray transparencies and to produce an image which physicians can use to perform radio-diagnosis.

20 Claims, 4 Drawing Sheets

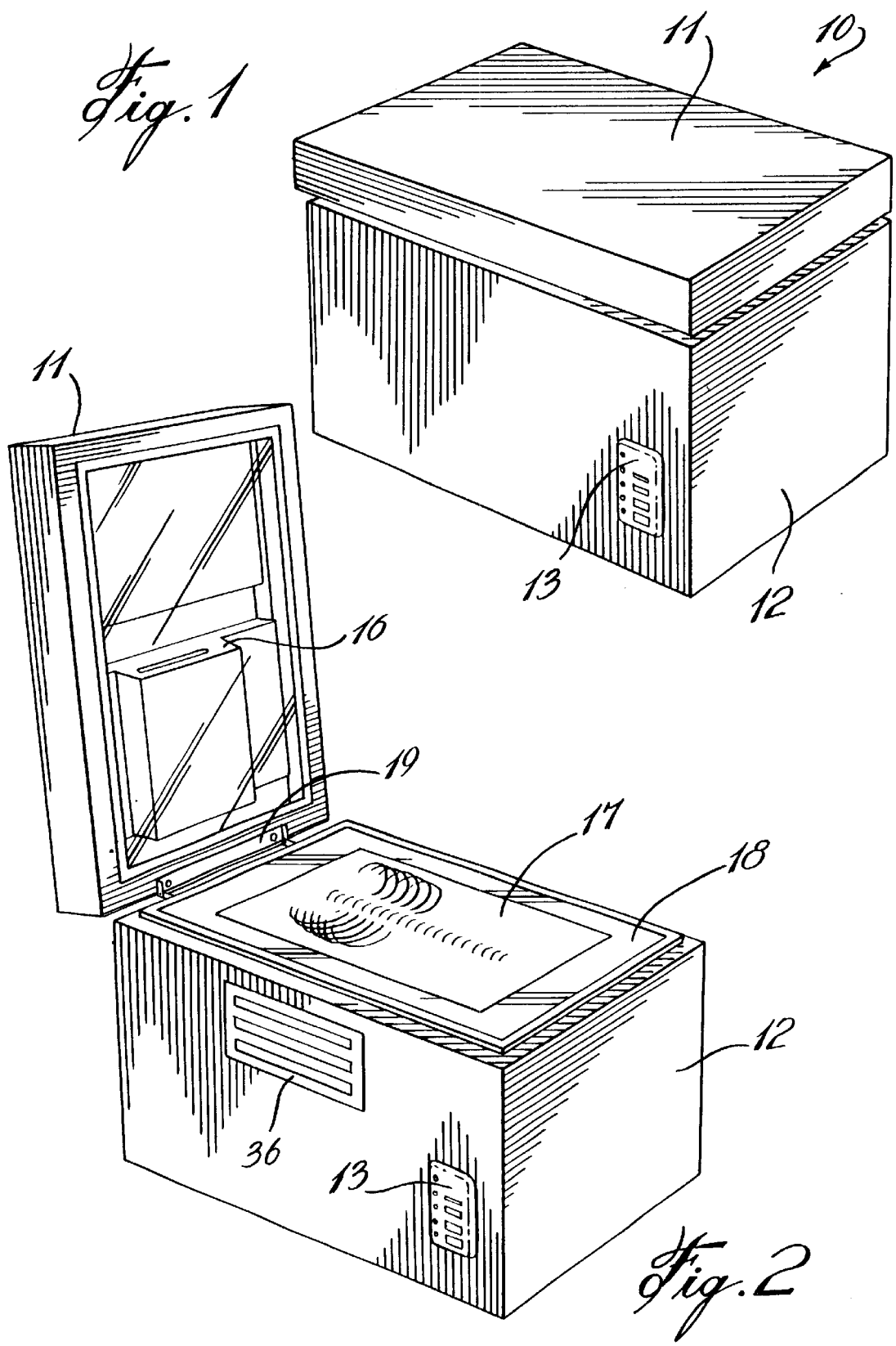

X-RAY TRANSPARENCY SCANNER

FIELD OF THE INVENTION

The invention relates to a light box enabling a reflective-type image scanner to digitize an X-ray transparency.

BACKGROUND OF THE INVENTION

Scanners are used more and more to communicate information in a paper-free format. These devices are especially useful when the original copy must be kept safely but duplicable copies must be readily available. Photocopiers are often used to duplicate information with an obvious degradation of the quality of the image at each copy. Scanners solve this problem by creating an electronic copy which can be stored, duplicated and printed as often as wished without degradation of the image.

Medical offices such as dentist offices, external clinics and private physician's offices are often required to exchange information on patients. This information often consists in X-rays of the patients. Since no good tool for copying and scanning such transparent media is available, doctors usually lend their copies to other physicians and hope for their safe return.

Scanners for transparencies are known and described in, for example, U.S. Pat. No. 5,282,081 to Chen et al. However, these scanners do not have the light intensity necessary to scan X-ray transparencies. When one tries to use such devices to scan X-ray transparencies, the resulting image is too dark to be used by a physician.

Photocopiers for X-ray transparencies are also known. For example, U.S. Pat. No. 4,702,593 to Detsch discloses a photocopier adapted to copy transparent materials by mounting a floodlight on an arm on top of the copying surface. The height of this floodlight is adjusted for best copy quality. However, the quality of the photocopies is too poor to permit the physicians to do an X-ray diagnosis. In order for a physician to have enough confidence in making a diagnosis, the quality of the image must be similar to that of the X-ray transparency. When a portion of the scanned image is zoomed, the physician must still be able to have a clear image of the patient.

SUMMARY OF THE INVENTION

Accordingly, an object of the present invention is to transform the conventional scanner already used in Doctors' offices into a scanner which can produce good digital images of X-rays transparencies.

Another object of the present invention is to provide a high power illumination source inside a housing which dissipates heat safely.

Another object is to provide an easy to use X-ray transparency scanner.

According to one aspect of the invention, an X-ray transparency scanner comprises: a light box housing; at least two incandescent lamps with reflectors mounted on a bottom wall of the housing; a scanning window provided on an exterior top wall of the housing and opposite the lamps, wherein the lamps are arranged to provide substantially even illumination of the scanning window; a rectifier for transforming AC current into DC current to supply to the lamps; a fan for cooling the lamps by exchanging air in the housing; an intensity selector for adjusting an intensity of the lamps; and a flatbed scanner hinged to the housing for scanning an X-ray transparency placed on the scanning window.

According to another aspect of the invention, there is provided an X-ray transparency scanner comprising: a light box housing; at least two flood lamps mounted on a bottom wall of the housing; a scanning window provided on an exterior top wall of the housing and opposite the lamps, wherein the lamps are arranged to provide substantially even illumination of the scanning window; a fan for cooling the lamps by exchanging air in the housing; an intensity selector for adjusting an intensity of the lamps; and a scanning device having a downward facing window for placing on the scanning window and scanning an X-ray transparency placed on the scanning window.

According to a third aspect of the present invention, there is provided an X-ray transparency scanner comprising: a light box housing; at least two incandescent lamps with reflectors mounted on a bottom wall of the housing; a scanning window provided on an exterior top wall of the housing and opposite the lamps, wherein the lamps are arranged to provide substantially even illumination of the scanning window; a rectifier for transforming AC current into DC current to supply to the lamps; a convection cooling apertures for letting warm air out of the housing; an intensity selector for adjusting an intensity of the lamps; a flatbed scanner hinged to the housing for scanning an X-ray transparency placed on the scanning window; a computer for managing the flatbed scanner; an on/off lamp switch controlled by the computer for turn on and off the lamps; and an over-temperature switch for turning off the lamps when a temperature inside the housing reaches a dangerous level.

For the purpose of the present application, the following terms are defined below.

The term "X-ray transparency" is intended to mean the recording on a transparent film of an image made by the effect of X-rays on a photographic plate, especially showing the position of bones etc. by their greater absorption of the rays.

The term "scanner" is intended to mean a device that reads a printed media and converts it into a graphics image for a computer.

BRIEF DESCRIPTION OF THE DRAWINGS

These and other features, aspects and advantages of the present invention will become better understood with regard to the following description and accompanying drawings wherein:

FIG. 1 illustrates the light box and a flatbed scanner in a scanning position;

FIG. 2 illustrates the light box and a flatbed scanner in an open position;

DETAILED DESCRIPTION OF THE PREFERRED EMBODIMENT

Figure 3:
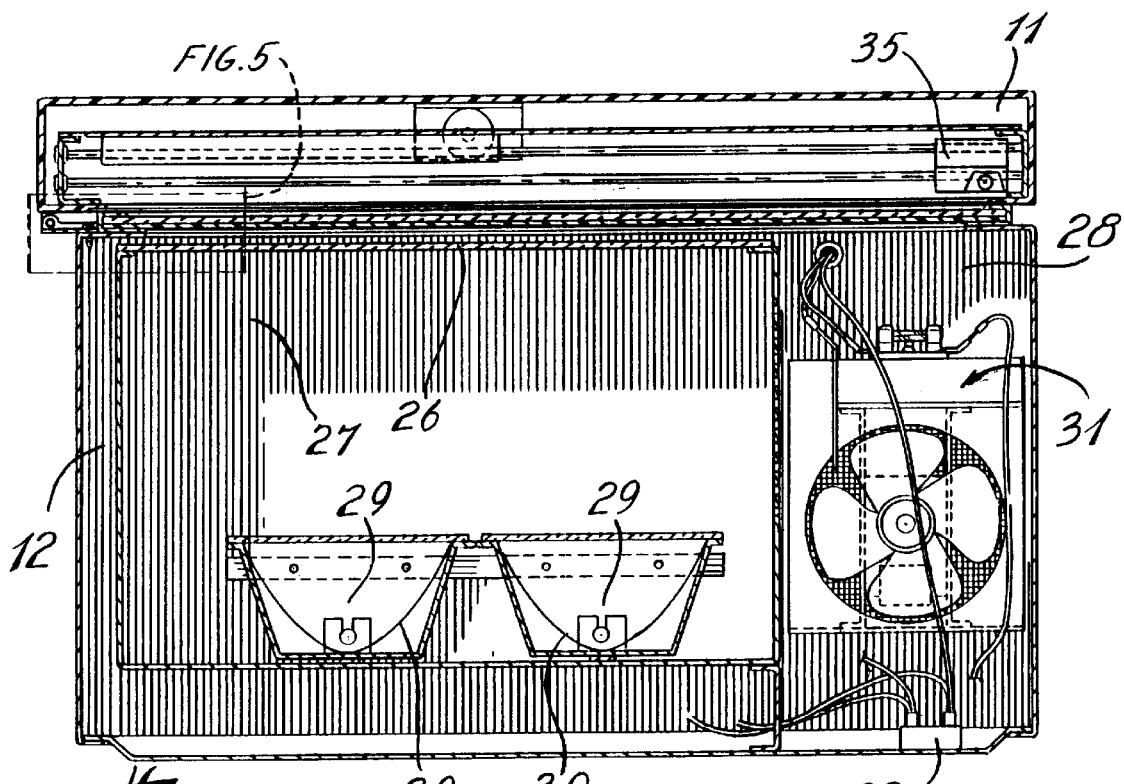
FIG. 3 illustrates a side elevational view of the light box with the flatbed scanner.

Referring now to FIG. 1, an X-ray scanner 10 is shown, comprising a conventional flatbed scanner 1, turned upside-down, to form a lid for a light box 12. The light box 12 preferably has an intensity selector 13 for choosing the intensity of the light when scanning.

FIG. 2 illustrates the X-ray scanner 10 in preparation for scanning. The light box 12 is located at the bottom of the apparatus. An X-ray transparency 17 is placed on the scanning window 18.

A conventional flatbed scanner 11 is used in conjunction with the light box 12. This scanner 11 can be of any brand and model although Plustek and Mustek scanners (for example, Mustek model A3 EP) have been found to work well. The scanning format is preferably 14"×17" to be able to scan transparencies of most formats. A conventional scanner usually comprises a scanning base and a lid. The lid is usually mounted with pivot elements to support the lid in a vertical position when an image is placed on the scanning window of the base. In a preferred embodiment of the present invention, these pivot elements are removed from the conventional scanner and adapted on the light box 12. The pivot elements 19 are used to hold the flatbed scanner 11 and the light box 18 together. The pivot elements can be any articulation-type device that can support the pressure of a flatbed scanner in a vertical position. The lid of the conventional scanner is therefore removed and the base of the scanner 11 is mounted, upside-down with the pivot elements 19 as the lid for the light box 12. It will be appreciated that if the conventional scanner is a flatbed scanner and is mounted on the housing of the apparatus, a spring-loaded mechanism could be used to prevent the lid, if dropped, from falling down on the scanning window and breaking the window or the elements inside of the housing.

It will be understood that the light box 12 could be manufactured and sold separately from the conventional scanner 11. Pivot elements 19 could be included or not with the purchase of the light box 12. It will also be understood that instead of using a flatbed scanner, a handheld scanner or any other type of scanners could be used. In the case where a handheld scanner is used, using pivot elements 19 is not important because the scanner would rest on the scanning window of the light box. The X-ray transparency would be scanned manually.

When the lid 11 of the X-ray scanner 10 is closed, the scanning window 16 of the conventional scanner 11 sandwiches the X-ray transparency 17 with the scanning window 18 of the light box 12.

Controlling the intensity of the light emitted from the light box 12 is very important when scanning transparencies. Depending on the development of the X-ray transparency, the image can be darker or paler. In order to closely reproduce the image, the intensity of the light has to be modified. To this effect, an intensity selector 13 is included. Preferably, this selector comprises 5 choices for the intensity. The selector 13 could be replaced by an intensity dial of the type used for household lighting control or could be replaced by switches.

Referring now to FIG. 3, there is shown the interior of the conventional scanner 11 and of the light box 12. The internal components of the conventional scanner 11 are not relevant for the purpose of this invention and will be left undescribed. However, it is necessary to point out that the conventional scanner 11 comprises a scanning head 35 which moves in the conventional scanner 11 to create the digital image of object scanned. The light box 12 comprises two sections. A first section 27 houses two 500 watt bulbs 28 and 29 located, side-by-side, at the bottom of the housing 12. These lamps 28 and 29 are high intensity incandescent lamps, preferably halogen and often sold for exterior lighting purposes. Each lamp lies in a curved reflective container 30 which directs the light into a flood beam. These containers could have mirror reflective coating for greater reflection of the light of the lamps. The lamps are often referred to as floodlights. The arrangement of the lamps 28 and 29 is chosen to provide full and substantially even illumination of the diffuser sheet 25. Preferably, these lamps are placed 15 cm from the first window 26. The lamps are preferably supplied with DC rectified power in order to produce the best quality of images. If an AC supply is used for the lamps, filament flicker may cause noisy lines to appear on the scanned image. It has been found that a minimum power level of 600 watts for the illumination in the housing is sufficient for getting acceptable results. However, a power level of 1000 watts has been found to be the preferred power level.

In the embodiment shown in FIG. 3, the housing 12 is separated into two sections 27 and 28. It should be understood that a portion of the scanning window 18 above the section 28 is not illuminated. In order to obtain a scanning window of a full 17", the separation of the sections could be removed or moved to enlarge the section 27 of the lamps. Then, a third lamp (not shown) could be placed, alongside the existing lamps 28 and 29, in the same arrangement. In this way, three lamps or more of the type described could be used in order to obtain more illumination. However, in order to obtain best results, only two lamps of the type described are necessary. The lamps 28 and 29 are shown fully supported by the bottom wall of the portion 27 of the casing 12. However, in order to modify the intensity of the light emitted at the scanning window 18 permanently, the lamps could be placed at an angle, either an acute angle at which more light would be focused in the center of the scanning window or at an obtuse angle at which more light would reach the extremities of the scanning window.

A thermoswitch (not shown) can be included close to one of the lamps to ensure that the temperature does not rise above a critical value if the lamps are left on for an extended period or if the cooling fan fails. The thermoswitch is sensitive to high temperatures and will shut down the system if the temperature rises to a dangerous level.

The second section 28 comprises a fan 31 for ventilating both sections and electronic circuitry 32. A diode bridge (not shown) is used to convert the AC current from the mains into DC. A conventional dimmer switch intensity controller circuit (not shown) is used, before the diode bridge, to control the intensity of the lamps 28 and 29. Five levels of intensity are preferable for the intensity selector 13. For example, the choices could be: 1. Maximum Lighting, 2. ⅞ Lighting, 3. ¾ Lighting, 4. ½ Lightning and 5. Off It is understood that the fan could be placed anywhere in the housing, preferably near the scanning window. A pair of fans could also be used to blow the warm air out of the housing. Also, the fan could be removed and slots or holes in the housing could enable to warm air to evacuate. as shown in FIG. 1. Also, a small door could be included in the housing and would be opened when the scanner is not in use to let the warm air out. Instead of using a thermoswitch, the computer which will display the scanned image could be used to control the lighting up and turning off of the lamps. By controlling the intensity controller for the lamps, the computer could instruct the intensity controller to turn on the lamps at a particular intensity level and to turn them off substantially after the scan is finished. That way, a fan would not necessarily be needed because the lamps would be turned off as soon as possible. However, if a fan is not used, it would be preferable to include a thermoswitch to prevent the temperature in the housing to rise above a dangerous level.

Figure 4:
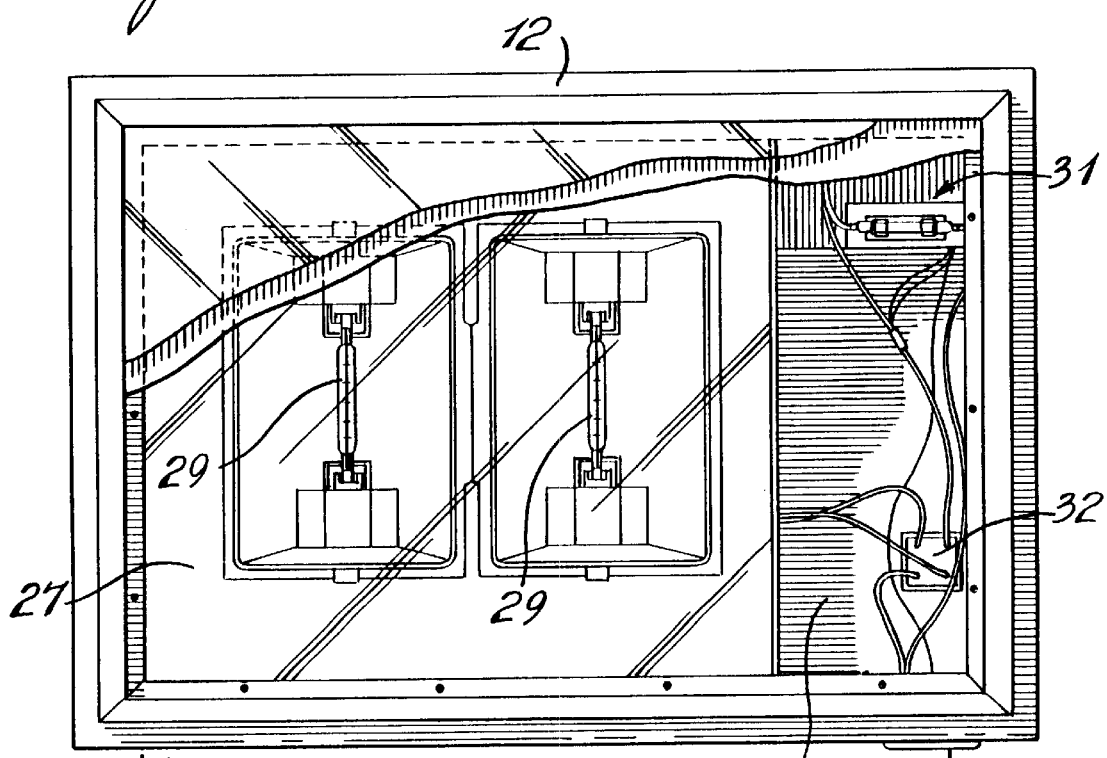
FIG. 4 illustrates a cut-away top view of the light box.

Referring now to FIG. 4, the light box 12 is shown from the top. Lamps 28 and 29 are oriented parallel to the scanning head 35 of the conventional scanner. If the lamps are placed perpendicular to the scanning head 35, transversal lines would appear on the scanned image. As shown, the lamps are rectangular parabolic halogen lamps.

Figure 5:
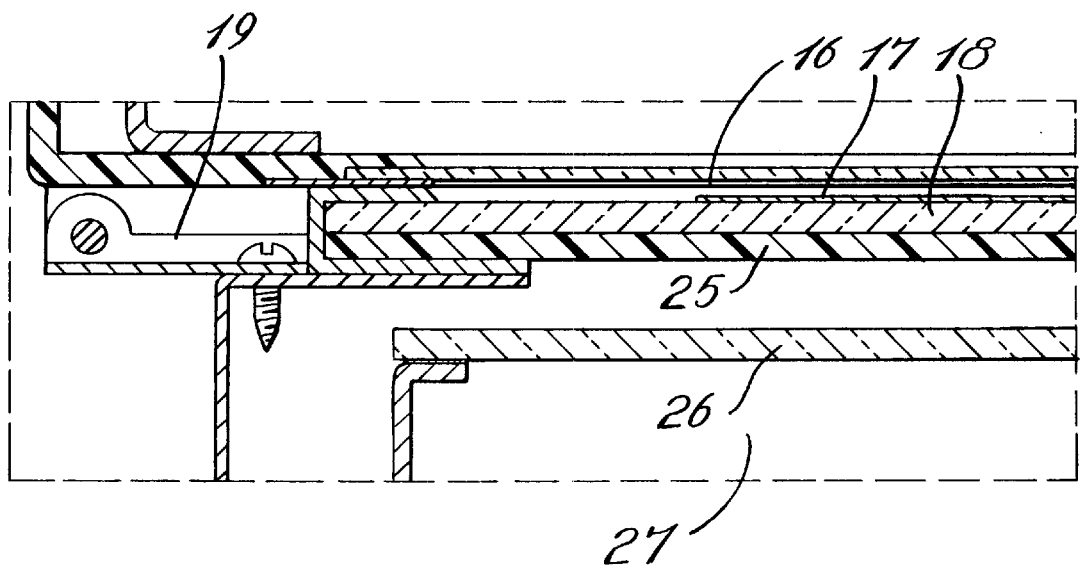
FIG. 5 illustrates a detail of FIG. 3.

Referring now to FIG. 5, a detail taken from FIG. 3, the different sheets at the top of the light box 12 are more clearly defined. The top of the light box 12 is preferably made of three sheets: a scanning window 18, preferably made of glass, on which the X-ray transparency 17 will be placed, a diffuser sheet 25, preferably made of white Plexiglas™ which is used to illuminate the X-ray evenly and a first window 26 preferably made of glass, spaced from the diffuser sheet and used to retain the heat generated by the lamps inside of the section 27 of the light box. The Plexiglas™ sheet can be replaced by another type of diffuser. It is important to have the scanning window 18 over the Plexiglas™ sheet 25 because the Plexiglas™ scratches easily. Once the Plexiglas™ is scratched, defects in the scanned image could appear. It is also important to have a window covering at least the section 27 of the light box because extreme heat is generated by the lamps 28 and 29. The window 26 serves as an insulation and protection sheet for the scanning window 18. The distance between the window 26 and the Plexiglas™ sheet 25 should be about 4 or 5 cm in order to obtain best results. It will be understood that if there was sufficient air flow in the housing to let the warm air out, and if the diffuser sheet was scratch-proof, only one sheet would be needed. This sheet would be a scratch-proof white diffuser with strong resistance to heat and direct pressure from the heavy lid formed by the conventional scanner. A diffuser sheet does not have to be included below the scanning window. One could choose to reduce the power level inside the housing and to remove the diffusion sheet. Only a scanning window would then be needed.

Figure 6:
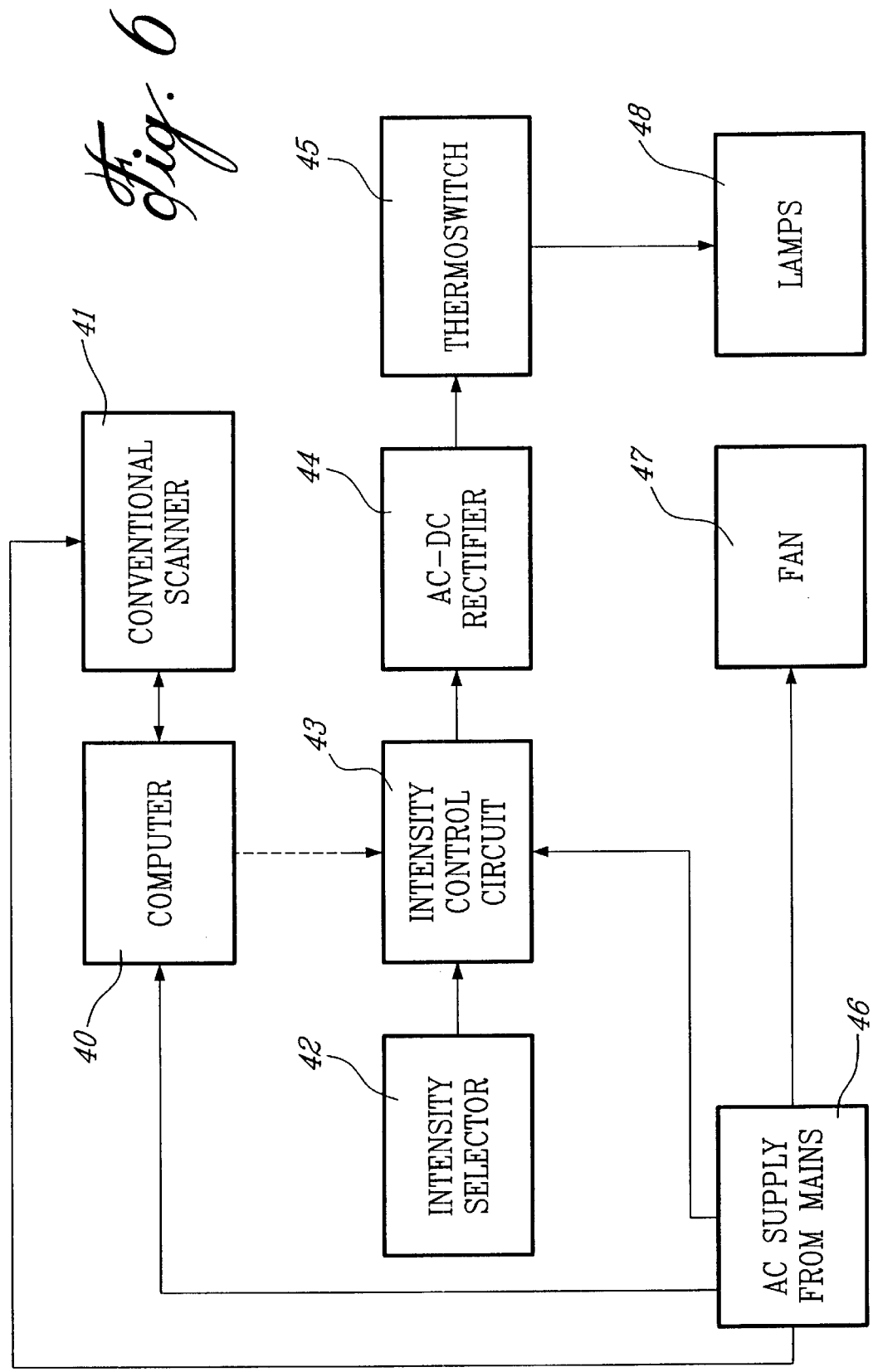
FIG. 6 is a block diagram of the components of the system.

Referring now to FIG. 6, the different components of the system according to the preferred embodiment are illustrated in a block diagram. A computer 40 is used to control the operation of the conventional scanner 41 and to manager the scanning, editing and zooming of an X-ray transparency. The computer 40 comprises a graphics editor and viewer for editing the scanned images. Typically, this graphics editor and viewer is included in the purchase of a conventional scanner and is used as prescribed by the manufacturer. However, it is understood that the image could be viewed and edited with any other software tool that handles the type of file generated during the scanning process.

Optionally, the computer 40 can also control the intensity control circuit 43 of the X-ray transparency scanner. In that case, the user would choose an intensity level deemed reasonable, using a software tool, to scan the X-ray transparency. The computer 40 would send a signal to the intensity control unit 43 to adjust the intensity of the lamps 48. If such a software implementation of the control is not implemented, an intensity selector 42 should be available on the light box of the X-ray transparency scanner. The intensity control circuit 43 is directly controlled by this intensity selector 42. The intensity control circuit 43 consists, for example, of a diode bridge. An AC-DC rectifier 44 is included in the case where the lamps 48 are supplied with DC rectified power. A thermoswitch 45 is included in the light box to ensure that the temperature inside the box does not rise above a dangerous level. As previously discussed, if the computer 40 controls the intensity control circuit, the computer 40 could perform the following steps: 1. Turn on the lamps in the light box, 2. Turn on the conventional scanner, 3. Scan the X-ray transparency, 4. Turn off the conventional scanner, 5. Turn off the lamps in the light box. In that case, the thermoswitch 45 would not be as useful because the lamps in the light box would not stay on for a very long period of time. However, for security purposes, the thermoswitch 45 should be included. The lamps 48 have been described previously. The intensity control circuit 43, the computer 40, the conventional scanner 41 and the fan 47 are supplied with AC supply from Mains 46. The fan 47 is used to evacuate warm air from the light box. It is optional, especially if the computer 40 manages the turning on and off of the lamps 48 but should be replaced with slots or holes in the housing of the light box to let the air out.

While the invention has been described in connection with specific embodiments thereof, it will be understood that it is capable of further modifications and this applications intended to cover any variations, uses, or adaptations of the invention following, in general, the principles of the invention and including such departures form the present disclosure as come within known or customary practice within the art to which the invention pertains and as may be applied to the essential features hereinbefore set forth, and as follows in the scope of the appended claims.

I claim:

1. An X-ray transparency scanner comprising:
    a light box housing;
    at least two flood lamps mounted on a bottom wall of said housing;
    a scanning window provided on an exterior top wall of said housing and opposite said lamps, wherein said lamps are arranged to provide substantially even illumination of said scanning window;
    a fan for cooling said lamps by exchanging air in said housing;
    an intensity selector for adjusting an intensity of said lamps; and
    a scanning device having a downward facing window for placing on said scanning window and scanning an X-ray transparency placed on said scanning window.

2. An X-ray transparency scanner as claimed in claim 1, further comprising:
    a thermoswitch for detecting a rise in temperature inside said housing and for shutting down a power supply to said lamps.

3. An X-ray transparency scanner as claimed in claim 1, wherein said scanning window comprises:
    a scratch-resistant scanning window top sheet provided on an exterior top wall of said housing;
    a diffusion sheet provided between said scanning window sheet and said at least two lamps; and
    a transparent insulation sheet provided between said diffusion sheet and said at least two lamps.

4. An X-ray transparency scanner as claimed in claim 1, wherein said at least two flood lamps consume a maximum power of at least 600 W.

5. An X-ray transparency scanner as claimed in claim 4, wherein said at least two flood lamps are rectangular parabolic halogen lamps and are oriented parallel to a scanning head of said scanning device.

6. An X-ray transparency scanner as claimed in claim 1, wherein said at least two flood lamps are provided with DC rectified mains current.

7. An X-ray transparency scanner as claimed in claim 4, wherein said at least two flood lamps are provided with DC rectified mains current.

8. An X-ray transparency scanner as claimed in claim 5, wherein said at least two flood lamps are provided with DC rectified mains current.

9. An X-ray transparency scanner as claimed in claim 1, wherein said scanning device is a flatbed scanner, further comprising pivot elements for mounting said flatbed scanner on said housing.

10. An X-ray transparency scanner as claimed in claim 9, wherein said pivot elements comprise a spring-loaded mechanism for preventing said scanning device from falling down when dropped.

11. An X-ray transparency scanner as claimed in claim 1, further comprising at least one alignment edge member provided on said scanning window to hold said X-ray transparency to be scanned at a fixed position.

12. An X-ray transparency scanner as claimed in claim 3, wherein said insulation sheet is a glass window.

13. An X-ray transparency scanner as claimed in claim 3, wherein said diffusion sheet is a sheet of white Plexiglas™.

14. An X-ray transparency scanner as claimed in claim 1, wherein said scanning window comprises a sheet of diffusion material.

15. An X-ray transparency scanner as claimed in claim 1, wherein said scanning window is a glass window.

16. An X-ray transparency scanner as claimed in claim 1, wherein said scanning device is a conventional flatbed scanner.

17. An X-ray transparency scanner comprising:
a light box housing;
at least two incandescent lamps with reflectors mounted on a bottom wall of said housing;
a scanning window provided on an exterior top wall of said housing and opposite said lamps, wherein said lamps are arranged to provide substantially even illumination of said scanning window;
a rectifier for transforming AC current into DC current to supply to said lamps;
a fan for cooling said lamps by exchanging air in said housing;
an intensity selector for adjusting an intensity of said lamps; and
a flatbed scanner hinged to said housing for scanning an X-ray transparency placed on said scanning window.

18. An X-ray transparency scanner as claimed in claim 17, wherein said scanning window is a transparent glass window.

19. An X-ray transparency scanner as claimed in claim 17, wherein said scanning window comprises a white diffuser layer and a transparent glass window.

20. An X-ray transparency scanner comprising:
a light box housing;
at least two incandescent lamps with reflectors mounted on a bottom wall of said housing;
a scanning window provided on an exterior top wall of said housing and opposite said lamps, wherein said lamps are arranged to provide substantially even illumination of said scanning window;
a rectifier for transforming AC current into DC current to supply to said lamps;
a convection cooling apertures for letting warm air out of said housing;
an intensity selector for adjusting an intensity of said lamps;
a flatbed scanner hinged to said housing for scanning an X-ray transparency placed on said scanning window;
a computer for managing said flatbed scanner;
an on/off lamp switch controlled by said computer for turn on and off said lamps; and
an over-temperature switch for turning off said lamps when a temperature inside said housing reaches a dangerous level.

* * * * *